(12) United States Patent
Kato (10) Patent No.: US 9,223,193 B2
(45) Date of Patent: Dec. 29, 2015

(54) PROJECTION TYPE DISPLAY APPARATUS AND METHOD OF COOLING LIGHT SOURCE

(75) Inventor: Hiroshi Kato, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 276 days.

(21) Appl. No.: 13/813,404

(22) PCT Filed: Aug. 2, 2010

(86) PCT No.: PCT/JP2010/063022
§ 371 (c)(1),
(2), (4) Date: Jan. 30, 2013

(87) PCT Pub. No.: WO2012/017511
PCT Pub. Date: Feb. 9, 2012

(65) Prior Publication Data
US 2013/0128236 A1   May 23, 2013

(51) Int. Cl.
G03B 21/16 (2006.01)
G03B 21/20 (2006.01)

(52) U.S. Cl.
CPC .............. *G03B 21/16* (2013.01); *G03B 21/2033* (2013.01)

(58) Field of Classification Search
CPC .............. G03B 21/16; G03B 21/2033; H05B 33/0869; H05B 33/0872; H05B 33/0875; H05B 33/0833; H05B 33/0845; H05B 33/0854
USPC .......... 353/52, 31, 54, 57; 315/113, 291, 274, 315/307, 308, 309, 310, 311, 185 S; 372/34; 355/30; 362/382, 234, 253, 800; 345/39
See application file for complete search history.

(56) References Cited

U.S. PATENT DOCUMENTS

2004/0008288 A1* 1/2004 Pate et al. ...................... 348/742
2006/0120084 A1* 6/2006 Sueoka .................. G03B 21/16
                                                                362/294
2009/0206236 A1* 8/2009 Kawashima et al. ......... 250/205

FOREIGN PATENT DOCUMENTS

CN       1707348 A    12/2005
CN       2872591 Y     2/2007
(Continued)

OTHER PUBLICATIONS

International Search Report in PCT/JP2010/063022 dated Aug. 31, 2010 (with English translation thereof).
(Continued)

*Primary Examiner* — Christina Riddle
*Assistant Examiner* — Christopher Lamb, II
(74) *Attorney, Agent, or Firm* — McGinn IP Law Group, PLLC (57) ABSTRACT

There is provided a projection-type display apparatus which solves the problem that when an amount of electric power applied to light sources is adjusted, the amount of electric power involved in the cooling of LEDs becomes greater than necessary. Coolers (107R, 107G, 107B) cool light sources (103R, 103G, 103B). Light sensor (111) detects the brightness of a surrounding area. Light case temperature detectors (112R, 112G, 112B) detect case temperatures which are the temperatures of cases of light sources (103R, 103G, 103B). Light source forward voltage detectors (113R, 113G, 113B) detect forward voltages of light sources (103R, 103G, 103B). Light source forward current detectors (114R, 114G, 114B) detect forward currents of light sources (103R, 103G, 103B). Adjuster (117) adjusts the amount of cooling power of coolers (107R, 107G, 107B) based on the forward voltage, the forward current, and the case temperatures.

3 Claims, 9 Drawing Sheets

(56) References Cited

FOREIGN PATENT DOCUMENTS

| | | | |
|---|---|---|---|
| JP | 2000-131668 A | | 5/2000 |
| JP | 2004-342557 A | | 12/2004 |
| JP | 2005-115350 A | | 4/2005 |
| JP | 2005-121890 A | * | 5/2005 |
| JP | 2006-154527 A | | 6/2006 |
| JP | 2006-162653 A | | 6/2006 |
| JP | 2007-087816 A | | 4/2007 |
| JP | 2008-176115 A | | 7/2008 |
| JP | 2008-185822 A | | 8/2008 |
| JP | 2009-192772 A | | 8/2009 |
| JP | 2010-035166 A | | 2/2010 |

OTHER PUBLICATIONS

Chinese Office Action dated Sep. 2, 2014 with English translation.

* cited by examiner

|  | RED(R) LED | GREEN(G) LED | BLUE(B) LED |
|---|---|---|---|
| Tj (max) | 110°C | 170°C | 170°C |
| WPE | 15% | 5% | 10% |
| Rj-c | 1°C/W | 1°C/W | 1°C/W |

Fig.8

Th: HEAT RADIATION SIDE TEMPERATURE
Qc: ENDOTHERMIC QUANTITY
I: INPUT CURRENT
ΔT: TEMPERATURE DIFFERENCE BETWEEN HEAT RADIATION SIDE
     AND HEAT ABSORPTION SIDE

Fig.9

Th: HEAT RADIATION SIDE TEMPERATURE
Qc: ENDOTHERMIC QUANTITY
I: INPUT CURRENT
ΔT: TEMPERATURE DIFFERENCE BETWEEN HEAT RADIATION SIDE
     AND HEAT ABSORPTION SIDE

Fig.10

PROJECTION TYPE DISPLAY APPARATUS AND METHOD OF COOLING LIGHT SOURCE

TECHNICAL FIELD

The present invention relates to a projection-type display apparatus using LEDs (Light-Emitting Diodes) and a method of cooling a light source thereof.

BACKGROUND ART

Projection-type display apparatus for projecting an image onto a screen have heretofore often employed a high-pressure mercury lamp as a light source. In recent years, attention has been paid to projection-type display apparatus employing LEDs instead of high-pressure mercury lamps.

LEDs are advantageous in that their brightness can be adjusted more quickly than high-pressure mercury lamps. Therefore, projection-type display apparatus which employ LEDs as a light source are capable of adjusting the brightness of a projected image depending on the brightness of the surrounding area by adjusting the brightness of the LEDs depending on the brightness of the surrounding area. Since the LEDs can be prevented from being energized for a higher level of brightness than necessary, the power consumption of the projection-type display apparatus is reduced.

The LEDs have a low power conversion efficiency (WPE: Wall Plug Efficiency), which represents the ratio of light output power to applied electric power, in the range from about 5% to 15%. Much of the applied electric power is converted into heat, which tends to increase the junction temperature Tj of the LEDs. If the junction temperature Tj of the LEDs goes higher than a certain level, then the light output power of the LEDs is abruptly reduced. Consequently, the projection-type display apparatuses which employ LEDs as a light source usually cool the LEDs so that the junction temperature Tj of the LEDs will not exceed a maximum junction temperature Tj(max). The LEDs are often cooled by a cooling means such as a Peltier device that is able to adjust the cooling power depending on the amount of applied electric power (see Patent document 1).

Figure 1:
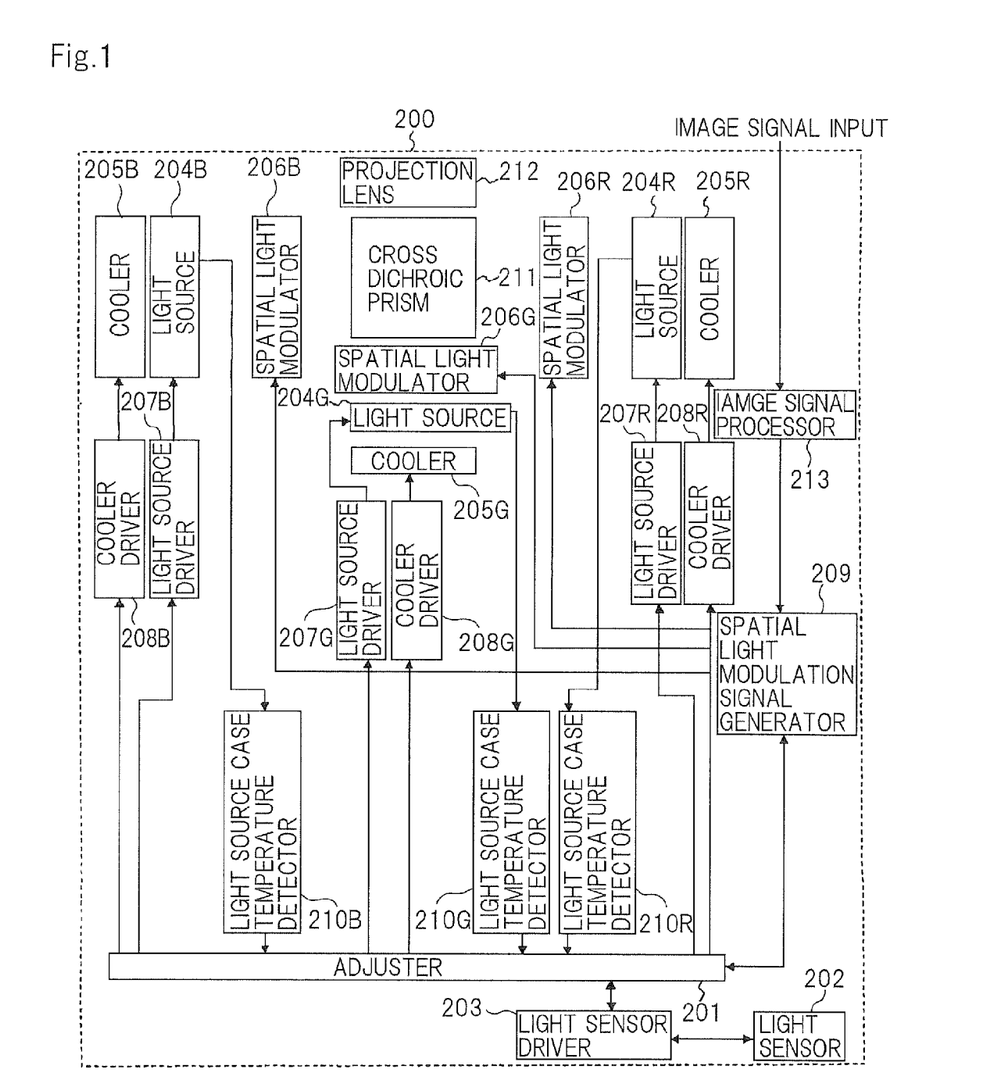
FIG. 1 is a block diagram showing the configuration of a projection-type display apparatus according to the background art.

FIG. 1 is a block diagram showing the configuration of a projection-type display apparatus having a cooling means for cooling LEDs and capable of changing the brightness of the LEDs depending on the brightness of the surrounding area.

As shown in FIG. 1, projection-type display apparatus 200 includes light sources 204R, 204G, 204B for emitting a red beam, a green beam, and a blue beam, respectively, coolers 205R, 205G, 205B for cooling respective light sources 204R, 204G, 204B, and adjuster 201 for adjusting the amount of electric power applied to light sources 204R, 204G, 204B and the amount of electric power applied to coolers 205R, 205G, 205B.

Each of light sources 204R, 204G, 204B comprises an LED and an LED case housing the LED. Each of coolers 205R, 205G, 205B comprises a Peltier device.

Adjuster 201 adjusts the brightness of each LED by adjusting the amount of applied light source electric power W, which is the amount of electric power applied to the LED, depending on the detection result of light sensor 202 that detects the brightness of the surrounding area.

Adjuster 201 also adjusts the amount of applied cooler electric power, which is the amount of electric power applier to coolers 205R, 205G, 205B, depending on the detection results of light source case temperature detectors 210R, 210G, 210B that detect case temperatures Tc of the LED cases of respective light sources 204R, 204G, 204B.

Generally, it is known that the equation "$Tj = If \times Vf \times (1-WPE/100) \times Rj\text{-}c + Tc$" is satisfied between the junction temperature Tj of the LED and the case temperature Tc of the LED case where If represents a forward current of the LED, Vf a forward voltage of the LED, WPE, a power conversion efficiency of the LED, and Rj–c the thermal resistance between the LED junction and the LED case. In the above equation, the product If×Vf of the forward current If and the forward voltage Vf represents the amount of applied power supply electric power W that is applied to the LED. The power conversion efficiency WPE and the thermal resistance Rj–c are usually regarded as constants that are determined for each LED.

As can be seen from the above equation, if the amount of applied power supply electric power W is constant, then the maximum case temperature which is the case temperature Tc at the time the junction temperature Tj is the maximum junction temperature Tj(max) is uniquely determined. If the amount of applied cooler electric power is adjusted so that the case temperature Tc becomes the maximum case temperature, then the junction temperature Tj will not exceed the maximum junction temperature Tj(max).

However, with the projection-type display apparatus 200, since the amount of applied power supply electric power W changes depending on the brightness of the surrounding area, the maximum case temperature also changes. More specifically, as the amount of applied power supply electric power W becomes greater, the maximum case temperature goes lower. In order that the junction temperature Tj will not exceed the maximum junction temperature Tj(max) even if the maximum case temperature changes, adjuster 201 adjusts the amount of applied cooler electric power so that the case temperature Tc is equalized to the maximum case temperature when the amount of applied power supply electric power W is of an upper limit value.

BACKGROUND ART DOCUMENTS

Patent Documents

Patent document 1: JP2004-342557A

SUMMARY OF THE INVENTION

Problems to be Solved by the Invention

With projection-type display apparatus 200 shown in FIG. 1, as the amount of applied power supply electric power W is adjusted depending on the brightness of the surrounding area, the amount of applied power supply electric power W may occasionally be lower than the upper limit value. The maximum junction temperature at this time is lower than the maximum junction temperature at the time the applied power supply electric power W is of the upper limit value. Therefore, by lowering the cooling capability of the Peltier device by lowering the amount of applied cooler electric power, the junction temperature Tj can be prevented from exceeding the maximum junction temperature Tj(max).

However, inasmuch as projection-type display apparatus 200 adjusts the amount of applied cooler electric power so that the case temperature Tc is always equal to the maximum case temperature at the time the amount of applied power supply electric power W is of the upper limit value, the amount of electric power consumed to cool the LEDs is greater than necessary.

It is an object of the present invention to provide a projection-type display apparatus which is capable of solving the above problem in which the amount of electric power consumed to cool the LEDs is greater than necessary when the amount of applied light source electric power is adjusted.

Means for Solving the Problems

According to the present invention, there is provided a projection-type display apparatus for projecting a beam from an LED to display an image, comprising a cooler for cooling said LED, a light detector for detecting the brightness of a surrounding area, a voltage detector for detecting the forward voltage of said LED, a current detector for detecting the forward current of said LED, a temperature detector for detecting the case temperature which represents the temperature of the case of said LED, and a controller for adjusting the brightness of said LED based on said brightness of the surrounding area and adjusting the amount of cooling power of said cooler based on said forward voltage, said forward current, and said case temperature.

According to the present invention, there is also provided a method of cooling a light source of a projection-type display apparatus for projecting a beam from an LED to display an image, comprising detecting the brightness of a surrounding area, detecting a forward voltage of said LED, detecting a forward current of said LED, detecting a case temperature which represents the temperature of a case of said LED, and cooling said LED with an amount of cooling power depending on said forward voltage, said forward current, and said case temperature.

Effects of the Invention

According to the present invention, the amount of electric power involved in the cooling of the LEDs can be of an appropriate value even when the amount of applied light source electric power is adjusted.

MODE FOR CARRYING OUT THE INVENTION

An exemplary embodiment of the present invention will be described below with reference to the drawings. In the description which follows, those parts which have identical functions are denoted by identical reference characters, and may not be described in detail.

Figure 2:
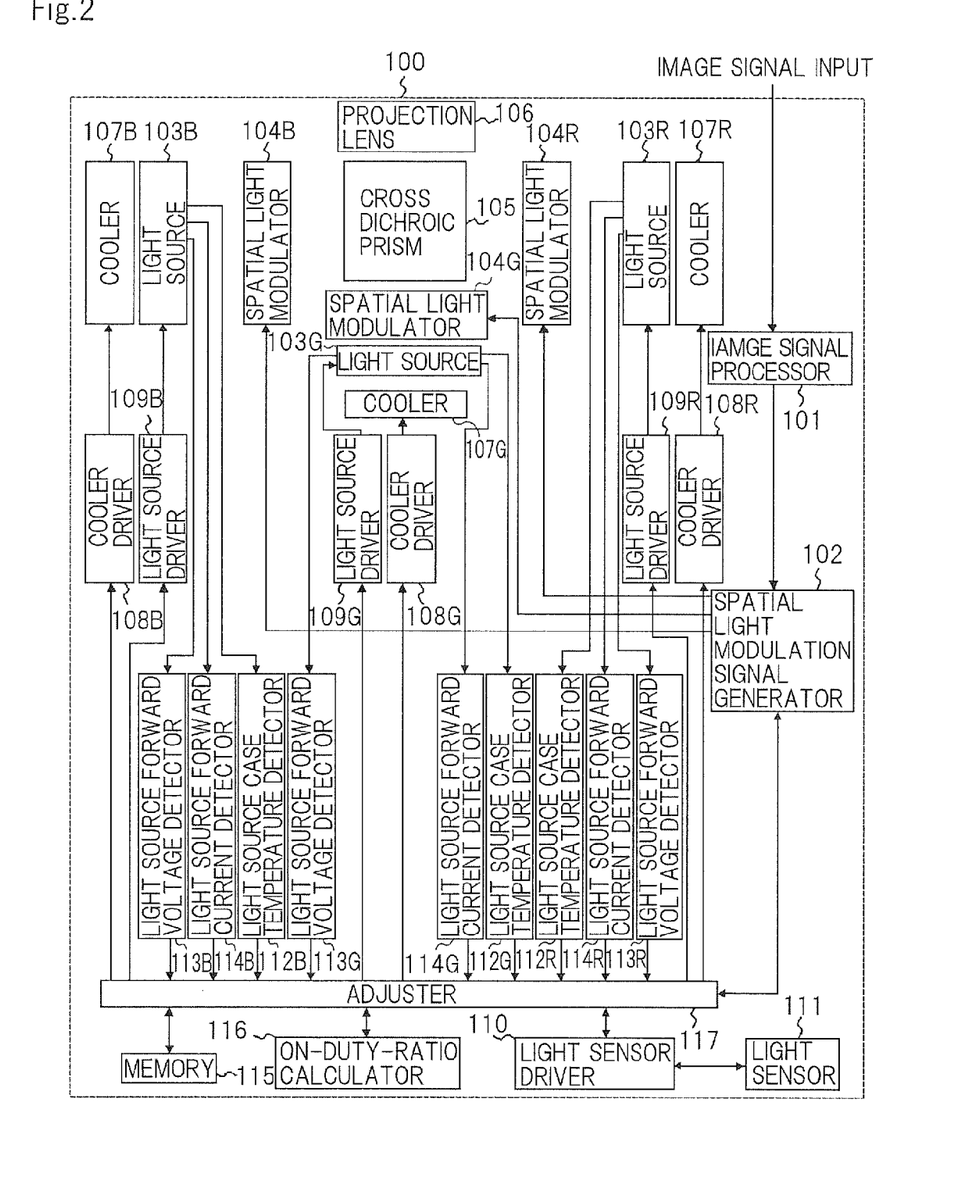
FIG. 2 is a block diagram showing the configuration of a projection-type display apparatus according to an exemplary embodiment of the present invention.

FIG. 2 is a block diagram showing the configuration of a projection-type display apparatus according to an exemplary embodiment of the present invention. As shown in FIG. 2, projection-type display apparatus 100 includes image signal processor 101, spatial light modulation signal generator 102, light sources 103R, 103G, 103B, spatial light modulators 104R, 104G, 104B, cross dichroic prism 105, projection lens 106, coolers 107R, 107G, 107B, cooler drivers 108R, 108G, 108B, light source drivers 109R, 109G, 109B, light sensor driver 110, light sensor 111, light source case temperature detectors 112R, 112G, 112B, light source forward voltage detectors 113R, 113G, 113B, light source forward current detectors 114R, 114G, 114B, memory 115, ON-Duty-Ratio calculator 116, and adjuster 117.

Image signal processor 101 is supplied with an image signal and performs various image signal processing processes such as resolution conversion on the supplied image signal.

Spatial light modulation signal generator 102 generates spatial light modulation signals for spatially modulating light depending on the supplied image signal that has been processed by image signal processor 101, and output the generated spatial light modulation signals to spatial light modulators 104R, 104G, 104B.

Figure 3:
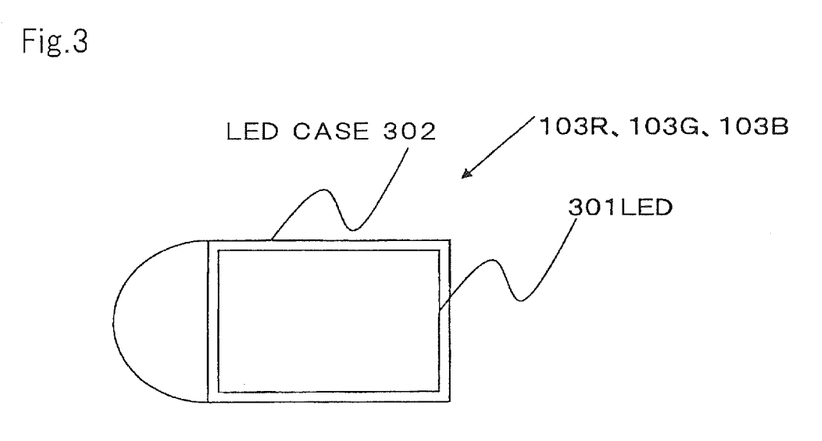
FIG. 3 is a view showing a configurational example of a light source.

As shown in FIG. 3, each of light sources 103R, 103G, 103B comprises LED 301 and LED case 302 housing LED 301 therein.

Light sources 103R, 103G, 103B emit light beams at intensities depending on the amount of applied light source electric power supplied from light source drivers 109R, 109G, 109B. The light beams emitted from light sources 103R, 103G, 103B have respective different wavelengths. It is assumed hereinbelow that light source 103R emits a red beam in a red wavelength range, light source 103G a green beam in a green wavelength range, and light source 103G a blue beam in a blue wavelength range. An LED used in light source 103R will be referred to as a red LED, an LED used in light source 103G as a green LED, and an LED used in light source 103B as a blue LED.

Spatial light modulators 104R, 104G, 104B spatially modulate the light beams from respective light sources 103R, 103G, 103B with the spatial light modulation signals from spatial light modulation signal generator 102, and emits the spatially modulated light beams.

Cross dichroic prism 105 combines the light beams from spatial light modulators 104R, 104G, 104B into a combined light beam, and emits the combined light beam.

Projection lens 106 projects the combined light beam from cross dichroic prism 105 onto a screen (not shown) to display an image on the screen.

Each of coolers 107R, 107G, 107B comprises a Peltier device. Coolers 107R, 107G, 107B cools light sources 103R, 103G, 103B with cooling power depending on the amount of applied cooler electric power that is supplied from respective cooler drivers 108R, 108G, 108B.

Cooler drivers 108R, 108G, 108B applies the amount of cooler electric power indicated by cooler control signals from adjuster 117 to coolers 107R, 107G, 107B, adjusting the amount of cooling power with which coolers 107R, 107G, 107B cool light sources 103R, 103G, 103B.

Light source drivers 109R, 109G, 109B energize respective light sources 103R, 103G, 103B at levels of brightness represented by light source control signals from adjuster 117.

According to the present exemplary embodiment, light source drivers 109R, 109G, 109B apply pulsed electric power as the amount of applied light source electric power to respective light sources 103R, 103G, 103B, thereby energizing light sources 103R, 103G, 103B. The levels of brightness of respective light sources 103R, 103G, 103B change depending on the duty ratio of pulsed electric power. Therefore, the light source control signals represent the duty ratios, and light source drivers 109R, 109G, 109B apply pulsed electric power at the duty ratios indicated by the light source control signals to respective light sources 103R, 103G, 103B.

Light sensor driver 110 applies sensor electric power to light sensor 111.

Light sensor 111 comprises a light detector which is energized by the sensor electric power from light sensor driver 110 and which detects the brightness in the surrounding area, i.e., outside projection-type display apparatus 100.

Light source case temperature detectors 112R, 112G, 112B detect case temperatures Tc, which are temperatures of the LED cases 302 of respective light sources 103R, 103G, 103B.

Light source forward voltage detectors 113R, 113G, 113B detect forward voltages Vf of LEDs 301 of respective light sources 103R, 103G, 103B.

Light source forward current detectors 114R, 114G, 114B detect forward currents If of LEDs 301 of respective light sources 103R, 103G, 103B.

Memory 115, On-Duty-Ratio calculator 116, and adjuster 117 make up a controller. The controller determines duty ratios of pulsed electric power to be applied to respective light sources 103R, 103G, 103B depending on the brightness of the surrounding area that is detected by light sensor 111, and output light source control signals representative of the determined duty ratios to adjust the levels of brightness of respective light sources 103R, 103G, 103B.

The controller also the amount of determines applied cooler electric power to be applied to coolers 107R. 107G, 107B based on the case temperatures Tc detected by light source case temperature detectors 112R, 112G, 112B, the forward voltages Vf detected by light source forward voltage detectors 113R, 113G, 113B, and the forward currents If detected by light source forward current detectors 114R, 114G, 114B, and output cooler control signals representative of the determined applied cooler electric power to cooler drivers 108R, 108G, 108B to adjust the cooling power of coolers 107R, 107G, 107B.

Memory 51 stores characteristic information representative of the characteristics of LEDs 301 used in respective light sources 103R, 103G, 103B. The characteristic information indicates, as the characteristics of LEDs 301, the maximum junction temperature Tj(max), the power conversion efficiency WPE, and the thermal resistance Rf-c between the LED junction and the LED case.

On-Duty-Ratio calculator 116 calculates, as "On-Duty Ratio" of each LED 301, the ratio of the difference between the maximum junction temperature Tj(max) and the case temperature Tc to the difference between the junction temperature Tj and the case temperature Tc, based on the characteristic information of LED 301, the case temperature Tc of LED case 302, forward voltage Vf and forward current If of LED 301.

Adjuster 117 outputs the light source control signals representative of the duty ratios depending on the brightness of the surrounding area to respective light sources 103R, 103G, 103B to adjust the levels of brightness of respective light sources 103R, 103G, 103B.

Adjuster 117 also outputs the cooler control signals representative of the "On-Duty Ratios" calculated by On-Duty-Ratio calculator 116 to cooler drivers 108R, 108G, 108B to adjust the amount of cooling power of coolers 107R, 107G, 107B.

More specifically, when the LEDs are energized, adjuster 117 sets the amount of applied cooler electric power represented by the cooler control signals to a preset value. Thereafter, if the "On-Duty Ratios" are greater than the upper limit value of an allowable range determined depending on the brightness of the LEDs, then adjuster 117 reduces the amount of applied cooler electric power, and if the "On-Duty Ratios" are smaller than the lower limit value of the allowable range, then adjuster 117 increases the amount of applied cooler electric power. Therefore, if the "On-Duty Ratios" are greater than the upper limit value of the allowable range, adjuster 117 reduces the amount of cooling power of coolers 107R, 107G, 107B, and if the "On-Duty Ratios" are smaller than the lower limit value of the allowable range, adjuster 117 increases the amount of cooling power of coolers 107R, 107G, 107B.

Operation of projection-type display apparatus 100 will be described below.

Figure 4:
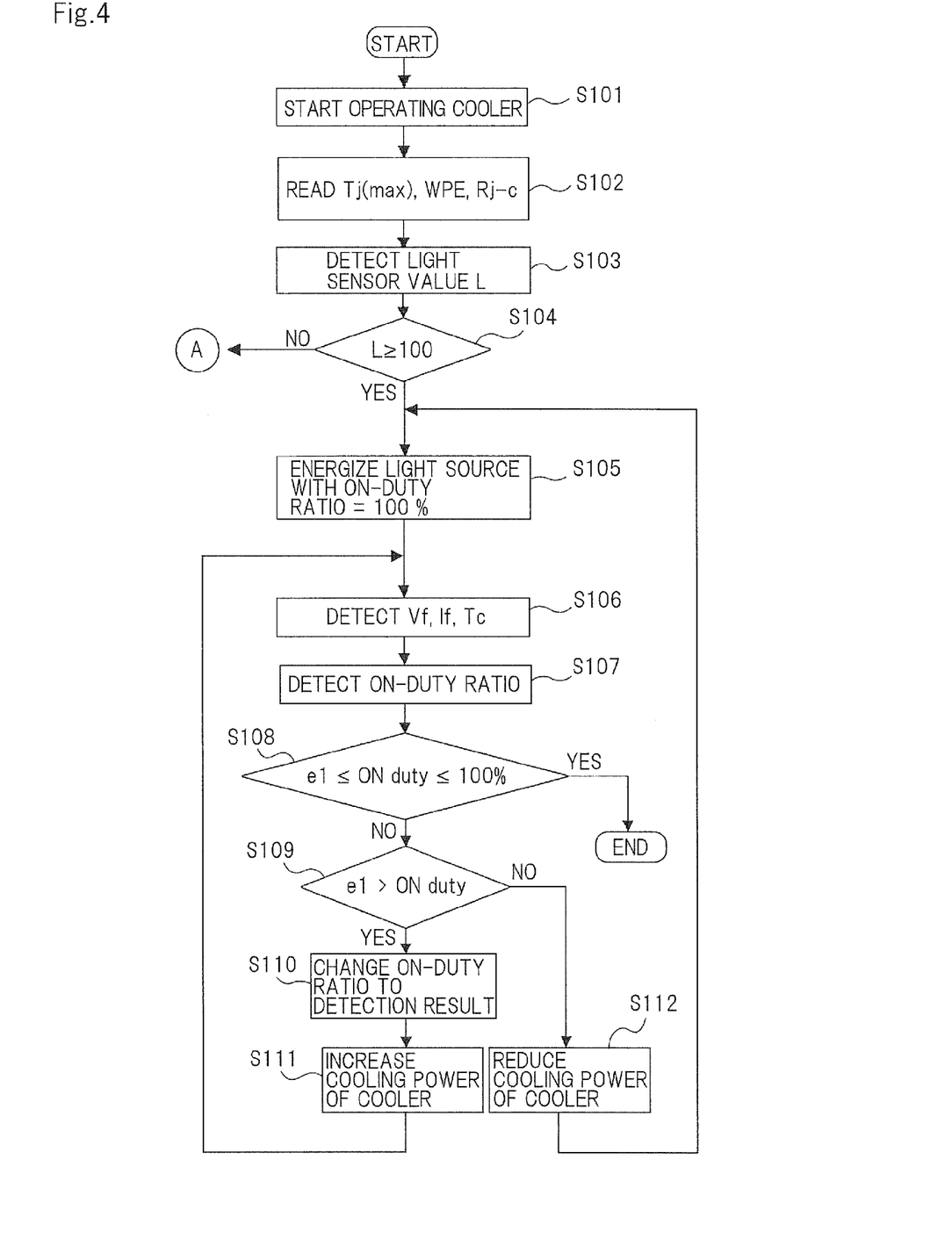
FIG. 4 is a flowchart of an example of an operation sequence of the projection-type display apparatus according to the exemplary embodiment.
Figure 5:
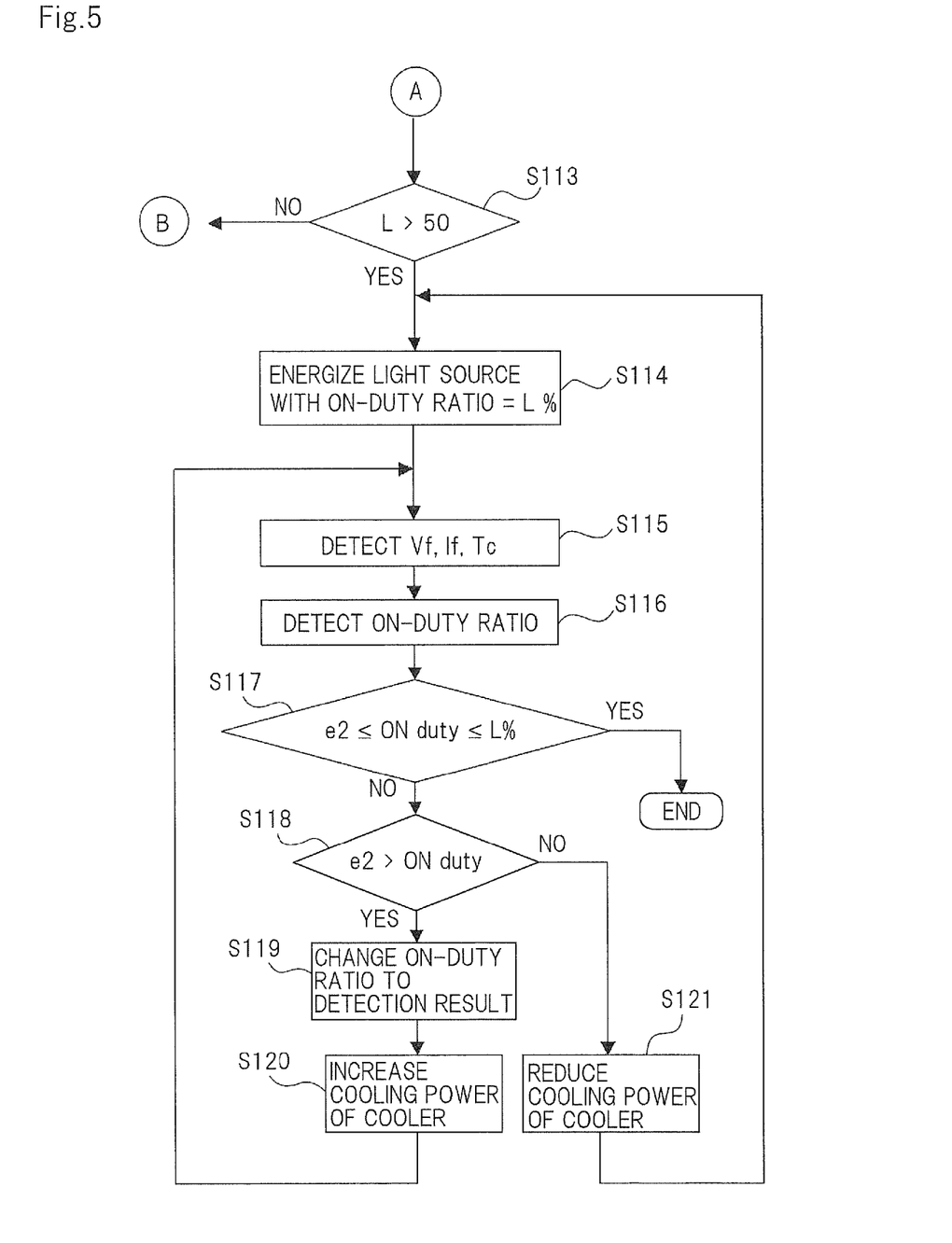
FIG. 5 is a flowchart of the example of the operation sequence of the projection-type display apparatus according to the exemplary embodiment.
Figure 6:
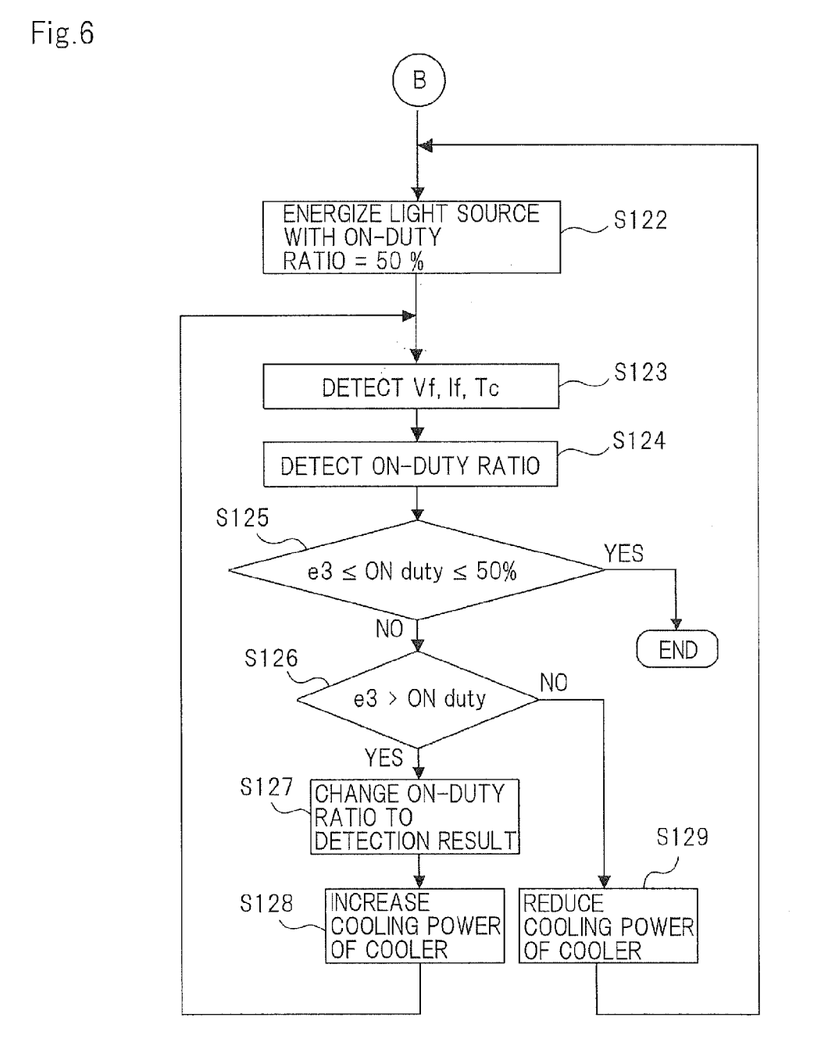
FIG. 6 is a flowchart of the example of the operation sequence of the projection-type display apparatus according to the exemplary embodiment.

FIGS. 4 through 6 are flowcharts of a light source control process of projection-type display apparatus 100. Since the same operation sequence is carried out for light sources 103R, 103G, 103B, the light source control process for light source 103R will be described below.

When the power supply of projection-type display apparatus 100 is turned on, adjuster 117 outputs a cooler control signal representative of predetermined the amount of applied cooler electric power to enable cooler driver 108R to start operating cooler 107R (step S101).

Then, adjuster 117 reads the characteristic information (maximum junction temperature Tj(max)), the power conversion efficiency WPE, and the thermal resistance Rf-c of light source 103R from memory 115 (step S102).

Thereafter, adjuster 117 outputs a drive signal to light sensor driver 110 to enable light sensor driver 110 to energize light sensor 111. Light sensor 111 detects the brightness of the surrounding area, and outputs a detection result L to adjuster 117 (step S103).

When adjuster 117 receives the detection result L, it judges whether or not the detection result L is equal to or greater than a predetermined first threshold value (hereinafter represented by "100" for illustrative purposes) (step S104). If the detection result L is equal to or greater than the first threshold value "100", then adjuster 117 outputs a light source control signal representative of a duty ratio=100% to light source driver 109A, which energizes light source 103R at the maximum brightness (step S105).

When light source 103R is energized, light source case temperature detector 112R detects a case temperature Tc of light source 103R and outputs it to adjuster 117. Light source forward voltage detector 113R detects a forward voltage Vf of light source 103R and outputs it to adjuster 117. Light source forward current detector 114R detects a forward current If of light source 103R and outputs it to adjuster 117 (step S106).

When adjuster 117 receives the case temperature Tc, the forward voltage Vf, and the forward current If, it outputs the case temperature Tc, the forward voltage Vf, the forward current If, and the characteristic information read in step S102 to On-Duty-Ratio calculator 116.

When On-Duty-Ratio calculator 116 receives the characteristic information, the case temperature Tc, the forward voltage Vf, and the forward current If, it calculates an "On-Duty Ratio" of light source 103R (step S107).

More specifically, On-Duty-Ratio calculator 116 calculates an "On-Duty Ratio" of light source 103R according to the equation 1:

$$ON\_duty = \frac{Tj(\max) - Tc}{Vf \times If \times \left(1 - \frac{WPE}{100}\right) \times Rj-c} \times 100 \quad [\text{Equation 1}]$$

In the equation 1, the denominator Vf×If×(1−WPE/100)× Rj−c on the right side becomes the difference Tj−Tc between the junction temperature Tj and the case temperature Tc of the LED in view of the equation about the junction temperature Tj and the case temperature Tc of the LED. In other words, On-Duty-Ratio calculator 116 calculates an "On-Duty Ratio" of light source 103R based on the junction temperature Tj and the case temperature Tc of the LED, or calculates, as an "On-Duty Ratio" of light source 103R, the ratio of the difference between the maximum junction temperature Tj(max) and the case temperature Tc of the LED to the difference between the junction temperature Tj and the case temperature Tc of the LED.

After having calculated the "On-Duty Ratio" of light source 103R, On-Duty-Ratio calculator 116 outputs the calculated "On-Duty Ratio" to adjuster 117. When adjuster 117 receives the "On-Duty Ratio", it judges whether or not the "On-Duty Ratio" falls in a first allowable range (e1≤On-Duty Ratio≤100%) (step S108). The first allowable range has a lower limit value e1 which is a positive value smaller than 100%.

If the "On-Duty Ratio" falls in the first allowable range, then adjuster 117 finishes the light source control process.

If the "On-Duty Ratio" does not fall in the first allowable range, then adjuster 117 judges whether or not the "On-Duty Ratio" is smaller than the lower limit value e1 of the first allowable range (step S109).

If the "On-Duty Ratio" is smaller than the lower limit value e1, then adjuster 117 decides that the junction temperature Tj is too high and outputs a light source control signal representative of the "On-Duty Ratio" to light source driver 109R. Adjuster 117 thus changes the duty ratio of light source 103R to the "On-Duty Ratio" calculated in step S108. Therefore, adjuster 117 reduces the brightness of light source 103R, and hence reduces the amount of heat generated by light source 103R (step S110).

Thereafter, adjuster 117 outputs a cooler control signal representative of the amount of applied cooler electric power that is greater than the predetermined the amount of applied cooler electric power described above to cooler driver 108R, which increases the amount of cooler electric power. Adjuster 117 thus can increase the amount of cooling power of cooler 107R (step S111).

Since the case temperature Tc of light source 103R drops due to the increase in the amount of applied cooler electric power, adjuster 117 calculates an "On-Duty Ratio" of light source 103R again back in step S105. If the calculated "On-Duty Ratio" falls in the first allowable range in step S108, then the light source control process is ended.

If adjuster 117 decides that the "On-Duty Ratio" is greater than the lower limit value e1 of the first allowable range in step S109, then adjuster 117 decides that the "On-Duty Ratio" is greater than the upper limit value of 100%, and outputs a cooler control signal representative of applied cooler electric power that is smaller than the predetermined applied cooler electric power described above to cooler driver 108R. Adjuster 117 thus reduces the applied cooler electric power and hence the cooling power of cooler 107R (step S112).

Since the case temperature Tc of light source 103R rises due to the reduction in the applied cooler electric power, adjuster 117 sets the "On-Duty Ratio" of light source 103R to 100% back in step S105. Thereafter, adjuster 117 calculates an "On-Duty Ratio" of light source 103R again in step S107. If the calculated "On-Duty Ratio" falls in the first allowable range in step S108, then the light source control process is finished.

If adjuster 117 decides that the detection result L is smaller than the first threshold value in step S104, then adjuster 117 judges whether the detection result L is greater than a second threshold (hereinafter represented by "50" for illustrative purposes) that is smaller than the first threshold value (step S113). If the decision result L is greater than the second threshold value, then adjuster 117 outputs a light source control signal representative of a duty ratio=L % to light source driver 109A, which energizes light source 103R at the level of brightness which is L % of the maximum brightness (step S114). L represents a value in the range from 50 to 100.

When light source 103R is energized, light source case temperature detector 112R detects a case temperature Tc of light source 103R and outputs it to adjuster 117. Light source forward voltage detector 113R detects a forward voltage Vf of light source 103R and outputs it to adjuster 117. Light source forward current detector 114R detects a forward current If of light source 103R and outputs it to adjuster 117 (step S115).

When adjuster 117 receives the case temperature Tc, the forward voltage Vf, and the forward current If, it outputs the case temperature Tc, the forward voltage Vf, the forward current If, and the characteristic information read in step S102 to On-Duty-Ratio calculator 116.

When On-Duty-Ratio calculator 116 receives the characteristic information, the case temperature Tc, the forward voltage Vf, and the forward current If, it calculates an "On-Duty Ratio" of light source 103R based on the characteristic information, the case temperature Tc, the forward voltage Vf, and the forward current (step S116). The "On-Duty Ratio" is calculated in the same manner as it is calculated in step S107.

After having calculated the "On-Duty Ratio" of light source 103R, On-Duty-Ratio calculator 116 outputs the calculated "On-Duty Ratio" to adjuster 117. When adjuster 117 receives the "On-Duty Ratio", it judges whether or not the "On-Duty Ratio" falls in a second allowable range (e2≤On-Duty Ratio≤L %) (step S117). The second allowable range has a lower limit value e2 which is a positive value smaller than L %.

If the "On-Duty Ratio" falls in the second allowable range, then adjuster 117 finishes the light source control process.

If the "On-Duty Ratio" does not fall in the second allowable range, then adjuster 117 judges whether or not the "On-Duty Ratio" is smaller than the lower limit value e2 of the second allowable range (step S118).

If the "On-Duty Ratio" is smaller than the lower limit value e2, then adjuster 117 decides that the junction temperature Tj is too high and outputs a light source control signal representative of the "On-Duty Ratio" to light source driver 109R.

Adjuster 117 thus changes the duty ratio of light source 103R to the "On-Duty Ratio" calculated in step S116 (step S119).

Thereafter, adjuster 117 outputs a cooler control signal representative of the amount of applied cooler electric power that is greater than the predetermined amount of applied cooler electric power described above to cooler driver 108R, which increases the amount of cooler electric power (step S120).

Since the case temperature Tc of light source 103R drops due to the increase in the amount of applied cooler electric power, adjuster 117 calculates an "On-Duty Ratio" of light source 103R again back in step S114. If the calculated "On-Duty Ratio" falls in the second allowable range in step S117, then the light source control process is ended.

If adjuster 117 decides that the "On-Duty Ratio" is greater than the lower limit value e2 of the second allowable range in step S118, then adjuster 117 decides that the "On-Duty Ratio" is greater than the upper limit value of L % of the second allowable range, and outputs a cooler control signal representative of amount of applied cooler electric power that is smaller than the predetermined amount of applied cooler electric power described above to cooler driver 108R. Adjuster 117 thus reduces the amount of applied cooler electric power and hence the amount of cooling power of cooler 107R (step S121).

Since the case temperature Tc of light source 103R rises due to the reduction in the amount of applied cooler electric power, adjuster 117 sets the "On-Duty Ratio" of light source 103R to L % back in step S114. Thereafter, adjuster 117 calculates an "On-Duty Ratio" of light source 103R again in step S116. If the calculated "On-Duty Ratio" falls in the second allowable range in step S117, then the light source control process is ended.

If adjuster 117 decides that the detection result L is equal to or smaller than the second threshold value in step S113, then adjuster 117 outputs a light source control signal representative of a duty ratio=50% (second threshold value) to light source driver 109A, which energizes light source 103R at the level of brightness which is 50% of the maximum brightness (step S122).

When light source 103R is energized, light source case temperature detector 112R detects a case temperature Tc of light source 103R and outputs it to adjuster 117. Light source forward voltage detector 113R detects a forward voltage Vf of light source 103R and outputs it to adjuster 117. Light source forward current detector 114R detects a forward current If of light source 103R and outputs it to adjuster 117 (step S123).

When adjuster 117 receives the case temperature Tc, the forward voltage Vf, and the forward current If, it outputs the case temperature Tc, the forward voltage Vf, the forward current If, and the characteristic information read in step S102 to On-Duty-Ratio calculator 116.

When On-Duty-Ratio calculator 116 receives the characteristic information, the case temperature Tc, the forward voltage Vf, and the forward current If, it calculates an "On-Duty Ratio" of light source 103R based on the characteristic information, the case temperature Tc, the forward voltage Vf, and the forward current (step S124). The "On-Duty Ratio" is calculated in the same manner as it is calculated in step S107.

After having calculated the "On-Duty Ratio" of light source 103R, On-Duty-Ratio calculator 116 outputs the calculated "On-Duty Ratio" to adjuster 117. When adjuster 117 receives the "On-Duty Ratio", it judges whether the "On-Duty Ratio" falls in a third allowable range (e3≤On-Duty Ratio≤50%) or not (step S125). The third allowable range has a lower limit value e3 which is a positive value that is smaller than 50%.

If the "On-Duty Ratio" falls in the third allowable range, then adjuster 117 ends the light source control process.

If the "On-Duty Ratio" does not fall in the third allowable range, then adjuster 117 judges whether or not the "On-Duty Ratio" is smaller than the lower limit value e3 of the third allowable range (step S126).

If the "On-Duty Ratio" is smaller than the lower limit value e3, then adjuster 117 decides that the junction temperature Tj is too high and outputs a light source control signal representative of the "On-Duty Ratio" to light source driver 109R. Adjuster 117 thus changes the duty ratio of light source 103R to the "On-Duty Ratio" calculated in step S124 (step S127).

Thereafter, adjuster 117 outputs a cooler control signal representative of the amount of applied cooler electric power that is greater than the predetermined amount of applied cooler electric power described above to cooler driver 108R, which increases the amount of cooler electric power (step S128).

Since the case temperature Tc of light source 103R drops due to the increase in the applied amount of cooler electric power, adjuster 117 calculates an "On-Duty Ratio" of light source 103R again back in step S123. If the calculated "On-Duty Ratio" falls in the second allowable range in step S125, then the light source control process is ended.

If adjuster 117 decides that the "On-Duty Ratio" is greater than the lower limit value e3 of the third allowable range in step S126, then adjuster 117 decides that the "On-Duty Ratio" is greater than the upper limit value of 50% of the third allowable range, and outputs a cooler control signal representative of amount of applied cooler electric power that is smaller than the predetermined amount of applied cooler electric power described above to cooler driver 108R. Adjuster 117 thus reduces the amount of applied cooler electric power and hence the amount of cooling power of cooler 107R (step S129).

Since the case temperature Tc of light source 103R rises due to the reduction in the amount of applied cooler electric power, adjuster 117 sets the "On-Duty Ratio" of light source 103R to 50% back in step S122. Thereafter, adjuster 117 calculates an "On-Duty Ratio" of light source 103R again in step S124. If the calculated "On-Duty Ratio" falls in the third allowable range in step S125, then the light source control process is ended.

The amount of applied cooler electric power in projection-type display apparatus 100 according to the present exemplary embodiment shown in FIG. 2 will be evaluated.

Figure 8:
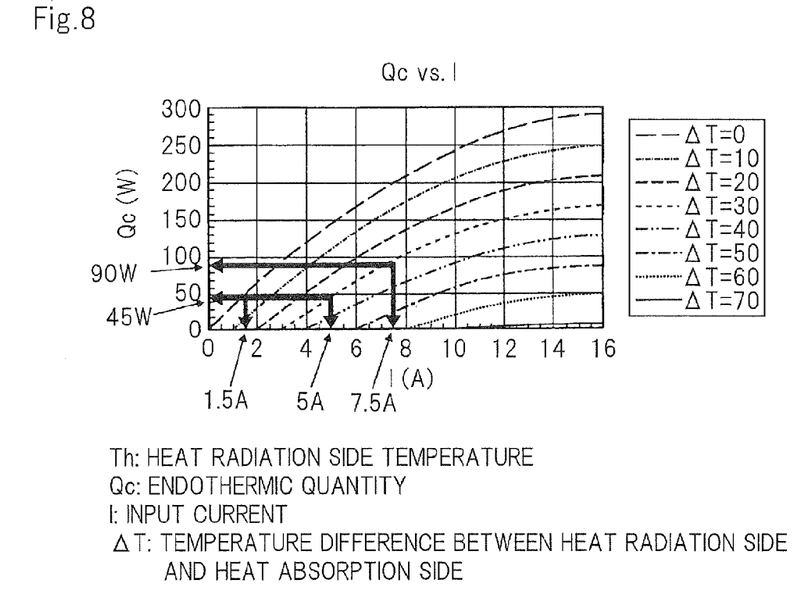
FIG. 8 is a diagram showing an example of endothermic characteristics representative of the relationship between current I and endothermic quantity Q of a Peltier device.
Figure 9:
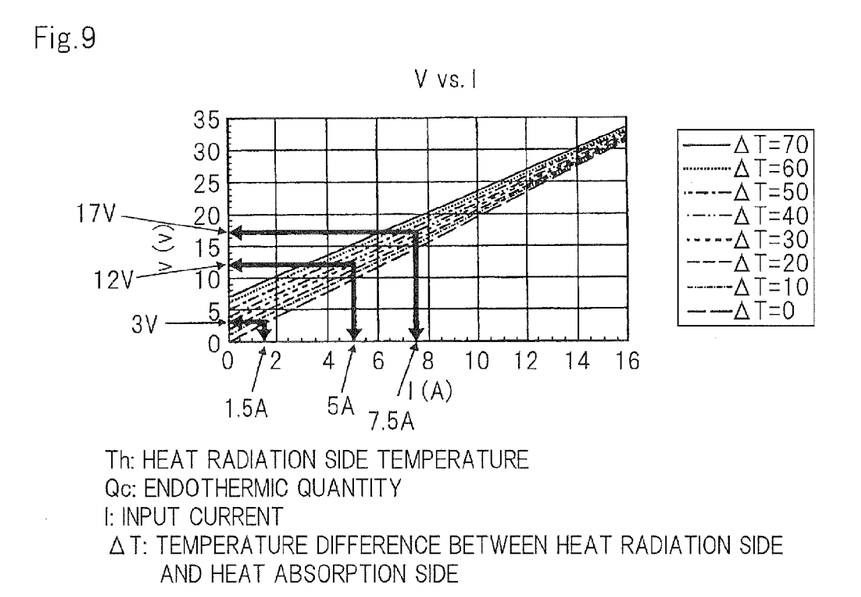
FIG. 9 is a diagram showing an example of current vs. voltage characteristics representative of the relationship between current I and voltage V of the Peltier device.

It is assumed hereinbelow that the red LED, the green LED, and the blue LED which are used respectively in light sources 103R, 103G, 103B have the characteristics (the maximum junction temperature Tj(max), the power conversion efficiency WPE, and the thermal resistance Rj–c between the LED junction and the LED case) shown in FIG. 7. It is also assumed that the Peltier devices that are used respectively in the coolers 107R, 107G, 107B have the characteristics shown in FIGS. 8 and 9. FIG. 8 shows endothermic characteristics representative of the relationship between the current I and endothermic quantity Q of a Peltier device at the time the heat radiation side has a temperature of 50° C., and FIG. 9 shows current vs. voltage characteristics representative of the relationship between the current I and voltage V of the Peltier device at the time when the heat radiation side has a temperature of 50° C.

It is assumed that after the power supply of projection-type display apparatus 100 is turned on, the detection result L of light sensor 111 represents the first threshold value "100" or greater, and adjuster 117 energizes light source 103R with a pulsed voltage having a duty ratio=100%. It is also assumed that the detection result L from light sensor 111 thereafter changes to a value smaller than the third threshold value "50", and adjuster 117 energizes light source 103R with a pulsed voltage having a duty ratio=50%, and that the detection result L from light sensor 111 goes back to the first threshold value "100" or greater, and adjuster 117 energizes light source 103R with a pulsed voltage having a duty ratio=100%.

Figure 10:
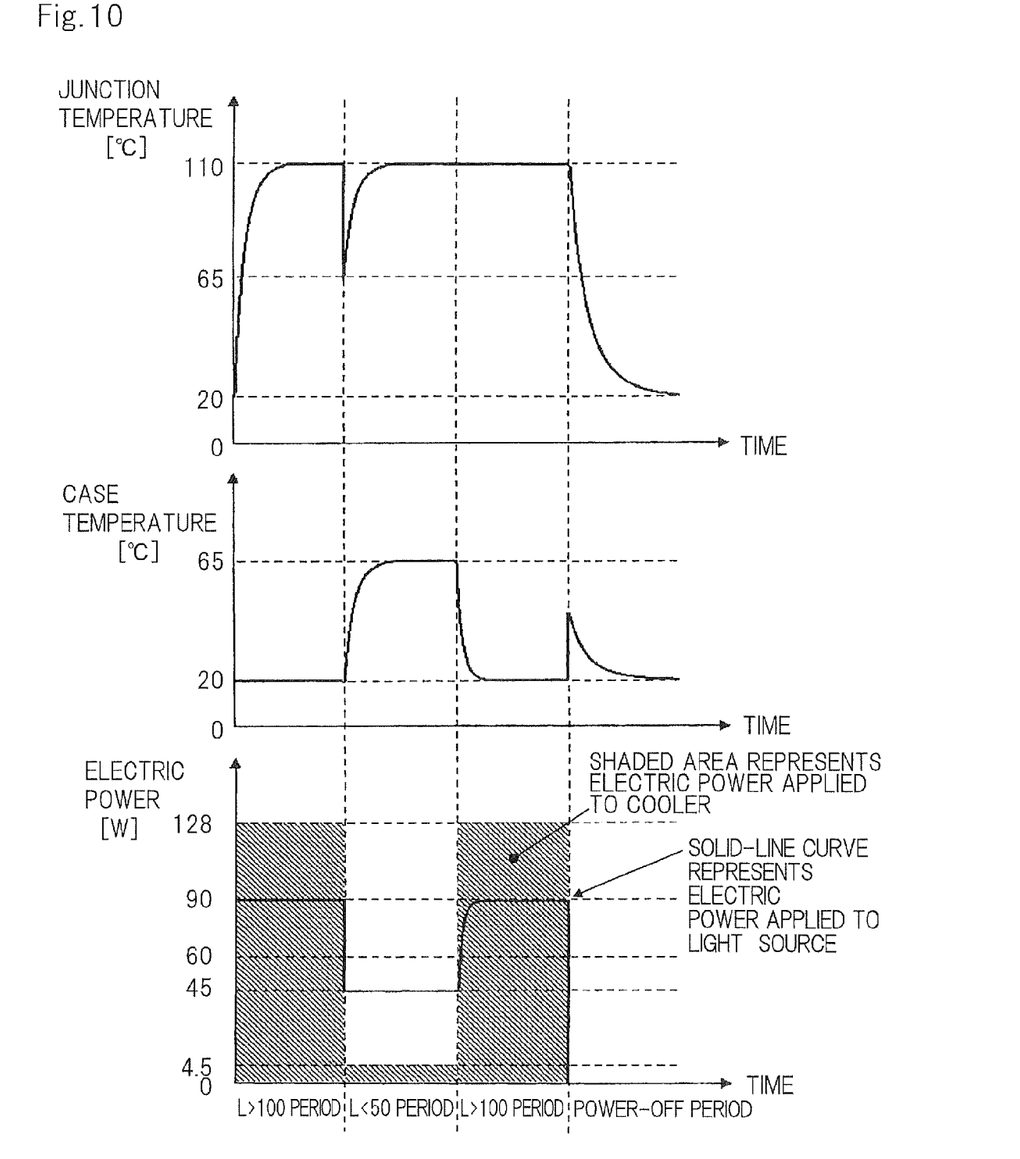
FIG. 10 is a diagram showing an example of changes in the amount of electric power applied to coolers of the projection-type display apparatus according to the exemplary embodiment.

FIG. 10 is a diagram showing time-dependent changes in the junction temperature Tj of light source 103R, time-dependent changes in the case temperature Tc of light source 103R, and time-dependent changes in the amount of electric power applied to cooler 107R at the time projection-type display apparatus 100 performs the above process.

When adjuster 117 is to energize light source 103 with a pulsed voltage having a duty ratio=100%, if the forward voltage Vf of light source 103R is 3.5 V and the forward current If of light source 103R is 30 A, then the maximum case temperature which is the case temperature Tc at which the junction temperature Tj becomes the maximum junction temperature Tj(max) is given as follows:

The maximum case temperature of the red LED=20° C.≈110° C.−300 W×0.35×(1−0.15)×1° C./W The maximum case temperature of the green LED=40° C.≈170° C.−300 W×0.45×(1−0.05)×1° C./W The maximum case temperature of the blue LED=115° C.≈170° C.−300 W×0.2×(1−0.1)×1° C./W The amount of electric power applied to the Peltier device for the red LED, for example, in order to keep the case temperature Tc as the maximum case temperature of 20° C. is calculated as follows:

The amount of electric power applied to the Peltier device=128 W≈7.5 A×17 V

When adjuster 117 is to energize light source 103 with a pulsed voltage having a duty ratio=50%, if the forward voltage Vf of light source 103R is 3.5 V and the forward current If of light source 103R is 30 A, then the maximum case temperature of light source 103R is given as follows:

The maximum case temperature=65° C.≈110° C.−3.5 V×30 A×0.5×(1−0.15)×1

The amount of electric power applied to the Peltier device for the red LED, for example, in order to keep the case temperature Tc as the maximum case temperature of 65° C. is calculated as follows:

The amount of electric power applied to the Peltier device=4.5 W=1.5 A×3 V

The amount of applied cooler electric power in projection-type display apparatus 200 shown in FIG. 1 will be evaluated.

Figure 7:
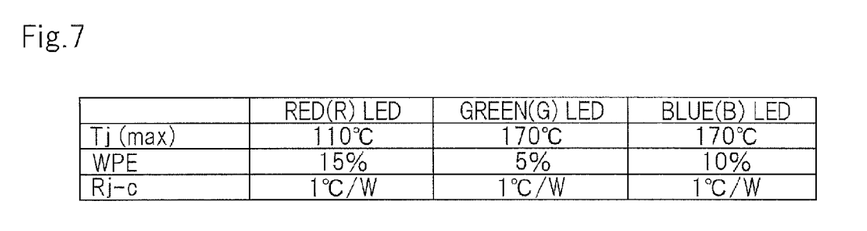
FIG. 7 is a diagram showing an example of characteristics of LEDs.

As is the case with each of the LEDs of projection-type display apparatus 100 shown in FIG. 2, each of the LEDs of projection-type display apparatus 200 has the characteristics shown in FIG. 7. As with the Peltier devices of projection-type display apparatus 100, the Peltier devices that are used in coolers 205R, 205G, 205B of projection-type display apparatus 200 have the characteristics shown in FIGS. 8 and 9.

It is assumed that after the power supply of projection-type display apparatus 200 is turned on, the detection result L of light sensor 202 represents the first threshold value "100" or greater, and adjuster 201 energizes light source 204R with a pulsed voltage having a duty ratio=100%. It is also assumed that the detection result L from light sensor 202 thereafter changes to a value that are smaller than the third threshold value "50", and adjuster 201 energizes light source 103 with a pulsed voltage having a duty ratio=50%, and that the detection result L from light sensor 202 goes back to the first threshold value "100" or greater, and adjuster 201 energizes light source 103 with a pulsed voltage having a duty ratio=100%.

Figure 11:
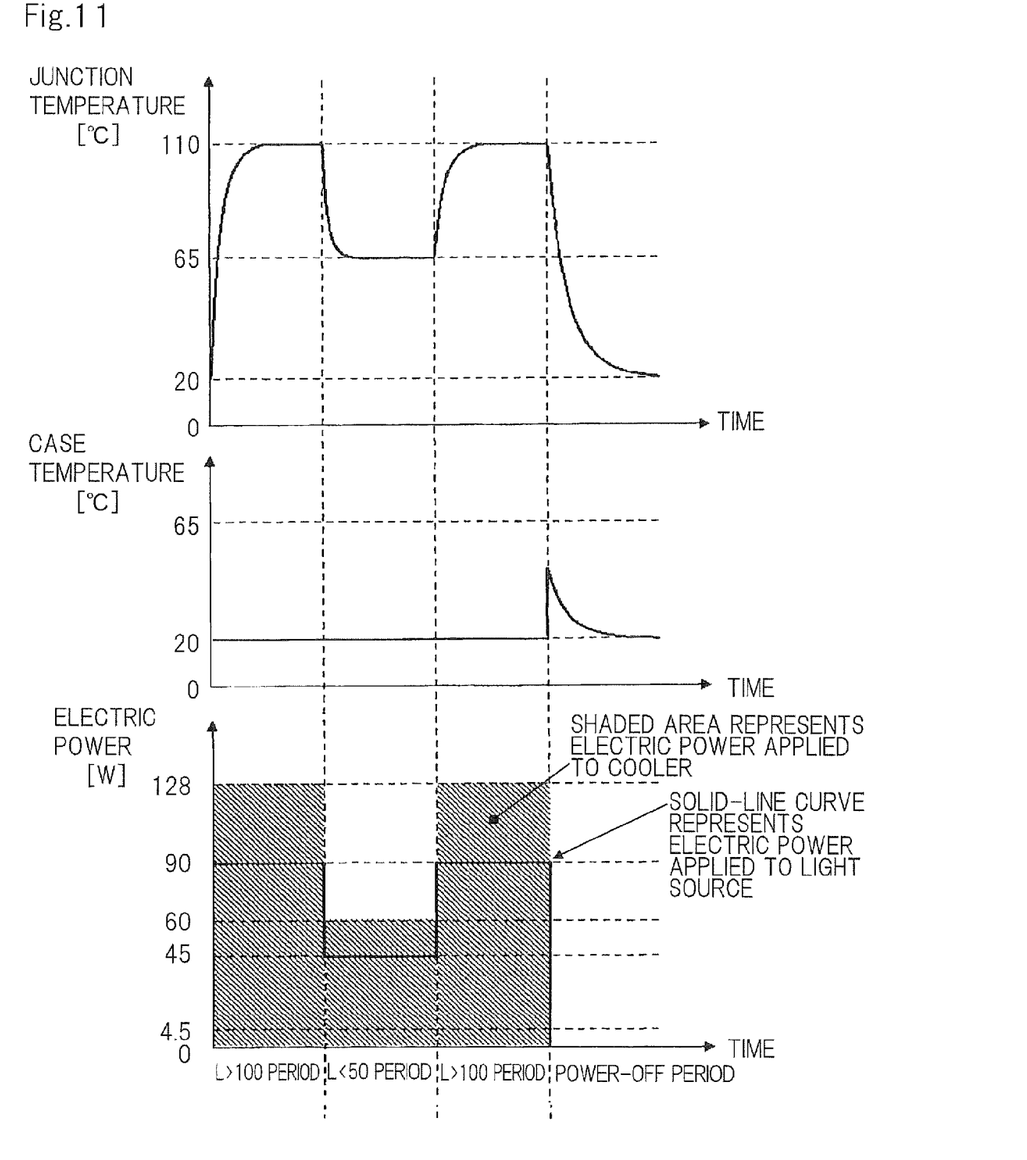
FIG. 11 is a diagram showing an example of changes in the amount of electric power applied to coolers of the projection-type display apparatus according to the background art.

FIG. 11 is a diagram showing time-dependent changes in the junction temperature Tj of light source 204R, time-dependent changes in the case temperature Tc of light source 204R, and time-dependent changes in the electric power applied to cooler 205R at the time projection-type display apparatus 200 performs the above process.

When the red LED is energized with a pulsed voltage having a duty ratio=100%, as projection-type display apparatus 200 keeps the case temperature Tc as the maximum case temperature of 20° C., the electric power applied to the Peltier devices of projection-type display apparatus 200 is the same as the amount of electric power applied to the Peltier devices of projection-type display apparatus 100. When the red LED is energized with a pulsed voltage having a duty ratio=50%, however, since projection-type display apparatus 200 keeps the case temperature Tc as the maximum case temperature of 20° C., the amount of electric power applied to the Peltier devices of projection-type display apparatus 200 is given as follows:

The amount of electric power applied to the Peltier devices=60 W=5 A×12 V

Therefore, if the detection result L from light sensor 202 is L>200, then the amount of electric power applied to the Peltier devices of projection-type display apparatus 200 shown in FIG. 1 is the same as the amount of electric power applied to the Peltier devices of projection-type display apparatus 100. However, if the detection result L from light sensor 202 is L<50, then the amount of electric power applied to the Peltier devices of projection-type display apparatus 200 shown in FIG. 1 is greater than the amount of electric power applied to the Peltier devices of projection-type display apparatus 100.

According to the present exemplary embodiment, as described above, cooler 107R cools light source 103R. Light sensor 111 detects the brightness of the surrounding area. Light source case temperature detector 112R detects the case temperature which represents the temperature of the case of light source 103R. Light source forward voltage detector 113R detects the forward voltage of light source 103R. Light source forward current detector 114R detects the forward current of light source 103R. Adjuster 117 adjusts the brightness of light source 103R based on the brightness of the surrounding area, and also adjusts the amount of cooling power of cooler 107R based on the forward voltage, the forward current, and the case temperature.

Consequently, the amount of cooling power is adjusted based on the forward voltage, the forward current, and the case temperature. Since the amount of applied light source electric power W can be grasped from the forward voltage and the forward current, the amount of electric power involved in the cooling of the LEDs can be of an appropriate value even when the amount of applied light source electric power is adjusted.

In the exemplary embodiment described above, the illustrated configuration is by way of example only, and the present invention is not limited to the illustrated configuration.

For example, although coolers 107R, 107G, 107B are illustrated as comprising Peltier devices, they may comprise cooling devices other than Peltier devices insofar as the amount of their cooling power can be adjusted depending on the amount of electric power applied thereto.

DESCRIPTION OF REFERENCE CHARACTERS 100 projection-type display apparatus
101 image signal processor
102 spatial light modulation signal generator
103R, 103G, 103B light source
104R, 104G, 104B spatial light modulator
105 cross dichroic prism
106 projection lens
107R, 107G, 107B cooler
108R, 108G, 108B cooler driver
109R, 109G, 109B light source driver
110 light sensor driver
111 light sensor
112R, 112G, 112B light source case temperature detector
113R, 113G, 113B light source forward voltage detector
114R, 114G, 114B light source forward current detector
115 memory
116 On-Duty-Ratio calculator
117 adjuster

The invention claimed is:

1. A display apparatus for projecting a beam from an LED to display an image, the display apparatus comprising:
a cooler that cools said LED;
a light detector that detects brightness of a surrounding area;
a voltage detector that detects a forward voltage of said LED;
a current detector that detects a forward current of said LED;
a temperature detector that detects a case temperature which represents a temperature of a case of said LED; and
a controller that adjusts brightness of said LED based on the brightness of the surrounding area and adjusts an amount of cooling power of said cooler based on said forward voltage, said forward current, and said case temperature,
wherein said controller calculates a ratio of a difference between a predetermined maximum junction temperature and said case temperature to a difference between a junction temperature of said LED and said case temperature, based on said forward voltage, said forward current, and said case temperature.

2. The display apparatus according to claim 1, wherein, if said ratio is greater than an upper limit of an allowable range determined depending on the brightness of said LED, said controller reduces said amount of cooling power, and if said ratio is smaller than a lower limit of said allowable range, said controller increases said amount of cooling power.

3. The display apparatus according to claim 2, wherein, if said ratio is smaller than said lower limit, said controller adjusts the brightness of said LED depending on said ratio.

* * * * *